United States Patent
Hacigumus et al.

(10) Patent No.: US 7,840,545 B2
(45) Date of Patent: *Nov. 23, 2010

(54) METHOD AND SYSTEM FOR PROVIDING ACCESS TO A DATABASE

(75) Inventors: Vahit H. Hacigumus, San Jose, CA (US); Balakrishna R. Iyer, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 482 days.

This patent is subject to a terminal disclaimer.

(21) Appl. No.: 11/851,319

(22) Filed: Sep. 6, 2007

(65) Prior Publication Data

US 2007/0294213 A1    Dec. 20, 2007

Related U.S. Application Data

(63) Continuation of application No. 10/280,306, filed on Oct. 25, 2002, now Pat. No. 7,315,847.

(51) Int. Cl.
G06F 17/30    (2006.01)

(52) U.S. Cl. .................. 707/705; 707/781; 707/783

(58) Field of Classification Search .......... 707/100, 707/104.1, 999.1, 999.107, 999.002, 999.009, 707/999.102, 705, 781, 783
See application file for complete search history.

(56) References Cited

U.S. PATENT DOCUMENTS

| | | | | | |
|---|---|---|---|---|---|
| 5,655,077 | A | * | 8/1997 | Jones et al. | 726/8 |
| 5,787,418 | A | * | 7/1998 | Hibbetts et al. | 707/4 |
| 5,924,089 | A | * | 7/1999 | Mocek et al. | 707/4 |
| 5,950,190 | A | * | 9/1999 | Yeager et al. | 1/1 |
| 6,108,651 | A | * | 8/2000 | Guha | 1/1 |
| 6,122,741 | A | * | 9/2000 | Patterson et al. | 726/17 |
| 6,223,239 | B1 | | 4/2001 | Olarig | |
| 6,401,216 | B1 | | 6/2002 | Meth et al. | |
| 6,496,833 | B1 | * | 12/2002 | Goldberg et al. | 1/1 |
| 6,499,026 | B1 | * | 12/2002 | Rivette et al. | 1/1 |
| 6,513,047 | B1 | * | 1/2003 | Talley | 707/803 |
| 6,665,304 | B2 | | 12/2003 | Beck et al. | |
| 6,738,077 | B1 | | 5/2004 | Wendker et al. | |
| 6,760,720 | B1 | * | 7/2004 | De Bellis | 707/3 |
| 6,850,252 | B1 | | 2/2005 | Hoffberg | |
| 6,854,034 | B1 | | 2/2005 | Kitamura et al. | |
| 6,880,086 | B2 | | 4/2005 | Kidder et al. | |
| 6,952,714 | B2 | | 10/2005 | Peart | |
| 6,965,911 | B1 | | 11/2005 | Coffman et al. | |
| 7,023,811 | B2 | | 4/2006 | Pinto | |

(Continued)

OTHER PUBLICATIONS

Hakan Hacigumus et al., Providing Database as a Service, Very Large Data Base Endowment, 14 pages.

*Primary Examiner*—Wilson Lee
*Assistant Examiner*—Thanh-Ha Dang
(74) *Attorney, Agent, or Firm*—Toler Law Group

(57) ABSTRACT

A method and system for providing user-friendly access to a database are described. More particularly, embodiments of the present invention provide a database server. There is at least one database coupled to the database server, wherein the database server enables access to the at least one database. A user-defined interface configured to have access to the at least one database, wherein the user-defined interface is customized to have functionality to suit specific needs of a user.

25 Claims, 18 Drawing Sheets

U.S. PATENT DOCUMENTS

| | | | |
|---|---|---|---|
| 7,080,070 B1 * | 7/2006 | Gavarini | 1/1 |
| 7,315,847 B2 * | 1/2008 | Hacigumus et al. | 707/784 |
| 2004/0024616 A1 | 2/2004 | Spector et al. | |
| 2005/0149542 A1 * | 7/2005 | Cosic | 707/100 |
| 2005/0229154 A1 * | 10/2005 | Hiew et al. | 717/110 |

* cited by examiner

FIG. 3

| FIRST_NAME | LAST_NAME | STREET | CITY | STATE | ZIP | PHONE |
|---|---|---|---|---|---|---|
| Mike | Curtis | 123 Abc St | Irvine | CA | 92611 | 949-856-3212 |
| John | Right | 345 Middle Road | Irvine | CA | 92611 | 949-856-9999 |
| Sarah | Brown | 421 Down St. | Los Angeles | CA | 91200 | 310-321-5533 |
| Judy | Black | 5431 Third St. | San Francisco | CA | 94130 | 750-121-3125 |
| Anita | Yee | 3059 Salt Lake Dr. | Saratoga | CA | 96134 | 408-435-3325 |
| Wes | Hom | 1055 Joaquin Road | Salt Lake City | Ut | 0090 | |
| Dante | Aubetr | 555 Bailey Ave. | San Jose | CA | 95133 | 567-1234 |
| Satya | Vadlamudi | 122 Woodbridge Lane | Chapel Hill | NC | 27514 | 919-928-0591 |
| Alberta | Lee | 555 Bailey Ave | San Jose | CA | 95133 | 408-345-1212 |
| Joe | Sawyer | 1234 High Street | Czzz | in | 54363 | 555-5555 |
| foo | bar | baz | bif | ME | cde | 4444444 |
| mike | hwu | 10275 n de anza blvd | cupertino | ca | 95014 | 240-5937 |
| Jane | Xu | 5600 Cottle | San Jose | MI | 98112 | 408-555-1212 |
| Dennis | McFarlin | nun | nunu | NU | 95014 | 555-1212 |
| Dennis | McFarlin | nun | nunu | NU | 95014 | 555-1212 |
| Dennis | McFarlin | nun | nunu | NU | 95014 | 555-1212 |
| Jim | K | 555 Bailey | San Jose | CA | 95138 | 555-1212 |
| Sandra | Baylor | 555 Bailey Avenue | San Jose | CA | 95141 | |
| Nancy | Brown | 1122 Boogie Boogie Ave. | Topeka | KS | 22299 | |

Next 20 rows

FIG. 14

FIG. 16 http://netdb2-2.almaden.ibm.com/servlet/runUserQuery?query=select+*+from+customer+where+first_na-Microsoft Internet Explorer File  Edit  View  Favorites  Tools  Help Back | Forward | Stop  Refresh  Home  Search  Favorites  History  Mail  Print Address: http://netdb2-2.almaden.ibm.com/servlet/runUserQuery?query=select+*+from+customer+where+last_name+like+'Brown%25'

RESULTS

| FIRST_NAME | LAST_NAME | STREET | CITY | STATE | ZIP | PHONE |
|---|---|---|---|---|---|---|
| Sarah | Brown | 421 Down St. | Los Angeles | CA | 91200 | 310-321-5533 |
| Nancy | Brown | 1122 Boogie Boogie Ave. | Topeka | KS | 22299 | |
| Mike | Brown | 333 que | San Jose | CA | 95123 | 408-123-4567 |

Executed Statment select * from customer where last_name like 'Brown%'

*Execution completed successfully...*

Done

FIG. 18

METHOD AND SYSTEM FOR PROVIDING ACCESS TO A DATABASE

CROSS-REFERENCE TO RELATED APPLICATIONS

Under 35 USC §120, this application is a continuation application and claims the benefit of priority to U.S. patent application Ser. No. 10/280,306 filed Oct. 25, 2002, entitled "Method and System for Providing Access to A Database", all of which is incorporated herein by reference.

FIELD OF THE INVENTION

The present invention relates to databases, and more particularly to a method and system for providing user-friendly access to a database.

BACKGROUND OF THE INVENTION

Database systems are used to store data and to allow users to access such data. Database systems can include a database server and one or more databases. The database system manages access to the databases. Today's database management systems also allow the user systems to be run by the database application. Examples of such functions are user-defined functions, triggers, and stored procedures. It is now possible to build non-trivial database applications.

A user typically accesses a database using an application program, which includes a database interface, often referred to as a browser interface. The database interface has access to the database system. More specifically, the database interface connects to the database system and can send queries to the database server to obtain information from one or more of the databases. Typically, the database interface includes fields to allow the user to enter such queries. The database interface also displays the data to the user.

The database system, which includes the database server and the database interface, is managed and maintained by database application programmers. For example, if the user requires one or more new fields to be added to the database interface, the database application programmers can modify the database interface to include the new fields. Similarly, if the user requires a particular new feature, e.g., a special sort function, the database application programmers can modify the database interface to include the new feature.

Because there are typically multiple users who access a given database, a database application programmer attempts to design a database interface that can accommodate the needs of many users. When needs change, the database application programmer make the required modifications to the database interface.

A problem with conventional database systems is changes to the database interface are administratively burdensome. Typically, as the number of users increases, the number of modifications also increases. The database interface should ideally change as the users' needs change. Also, the users of the database system may not agree as to how the database interface should be modified. As a result, databases interfaces are typically not very user friendly. Accordingly, access to databases is not user-friendly.

Accordingly, what is needed is a method and system for providing user-friendly access to a database. The method and system should be able to provide an interface that can be conveniently adapted to specific needs of the user. The present invention addresses such a need.

SUMMARY OF THE INVENTION

A system for providing user-friendly access to a database is enclosed. More particularly, embodiments of the present invention provide a database server. There is at least one database coupled to the database server, wherein the database server enables access to the at least one database. A user-defined interface configured to have access to the at least one database, wherein the user-defined interface is customized to have functionality to suit specific needs of a user.

BRIEF DESCRIPTION OF THE DRAWINGS

FIG. 3 is a view of a screen showing various metadata obtained from queries, in accordance with the present invention;

FIG. 14 is a view of another screen of the user-defined interface in accordance with the present invention;

FIG. 16 is a view of a screen that appears after the information of FIG. 15 has been submitted;

FIG. 18 is a view of a screen similar to that of FIG. 14 where the new customer information of FIG. 15 has been retrieved along with information of other customers with the same last name.

DETAILED DESCRIPTION

The present invention relates to databases, and more particularly to a method and system for providing user-friendly access to a database. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
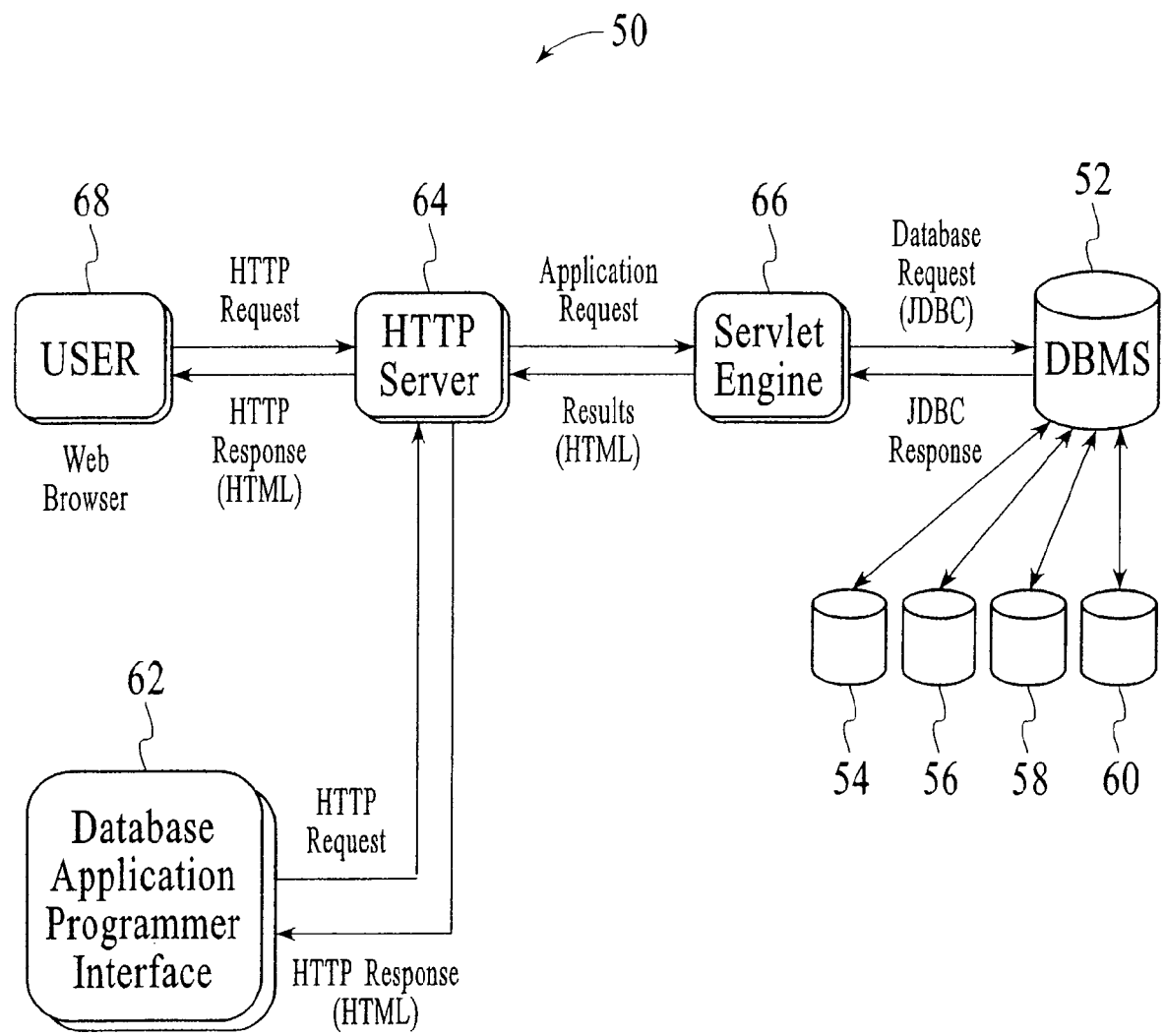
FIG. 1 is a block diagram of a database system in accordance with the present invention.

Generally, the embodiments of the present invention provide user-friendly access to a database. A user-defined interface is configured to have access to one or more databases, and the user-defined interface is customized with functionality to suit specific needs of a user. The user-defined interface can be customized by the user, a system administrator, even the database application programmer, etc. There can be more than one user-defined interface so that multiple users can each have a customized user-defined interface with which to access one or more databases. FIG. 1 describes an embodiment of the present invention.

FIG. 1 is a block diagram of a database system 50 in accordance with the present invention. The database system 50 includes a database server 52 and one or more databases 54, 56, 58, and 60. Although four databases are shown, there can be more than four databases and the specific number will depend on the specific application. In a preferred embodiment, the database system 50 is a relational database such as a NetDB2 database system. In this specific embodiment, the database system 50 has a NetDB2 application layer, which is tied to a database application programmer interface 62, hereinafter referred to as database interface 62. The database interface is a NetDB2 interface. The database interface 62 and the database server 52 are linked via an HTTP server 64 and a servlet engine 66.

Note that the present invention is not limited to NetDB2 database systems and may apply to other databases systems and still remain within the spirit and scope of the present invention.

The database interface 62 allows access to the database system 50 and its databases 54-60. Alternatively, a user can create a user-defined interface 68. The user-defined interface 68 and the database server 52 are linked via the HTTP server 64 and the servlet engine 66.

The user-defined interface 68 is customized with functionality to suit specific needs of the user, and the functionality of the user-defined interface can change as the user's needs change. Hence, a benefit of the user-defined interface 68 being customized is that it will be much more user friendly than the database interface 62.

In a preferred embodiment, the user-defined interface is created and managed by a user. This user is different from a database application programmer who manages the database system 50. The user merely has access to the database system 50, and more specifically one or more databases, via the user-defined interface. However, there can be multiple user-defined interfaces created by different users. Accordingly, in a specific embodiment, a manager of the database system, such as a database application programmer, can also create a user-defined interface to suit the manager's specific needs.

Because there can be multiple user-defined interfaces that access the databases, the specific mapping between user-defined interfaces to databases can vary and will depend on the specific application. For example, in one embodiment, a particular user-defined interface can be coupled to one or more databases uniquely associated with that user-defined interface. In another embodiment, multiple user-defined interfaces can share one or more databases.

In another embodiment, the user can not only create and manage a customized interface, but the user can also create and manage one or more databases. The user who created the database can define the access and control of such databases. In a specific embodiment, both a database application programmer and a user can create and manage a database. In a specific embodiment, only the user who created a particular user-defined database can manage it. Because the database application programmer manages the database system, the database application programmer controls the protocols for enabling connection between a user-defined database and the database system.

A system and method in accordance with the present invention allow the users to implement their own interfaces and communicate to the database system using such interfaces. Because the user interface design and functionality are driven by users, a system and method in accordance with the present invention provide full functionality with ease of use and performance, consistency, and simplicity. This is advantageous considering that most if not all of the users of the system are remote users accessing the service over the Internet.

Figure 2:
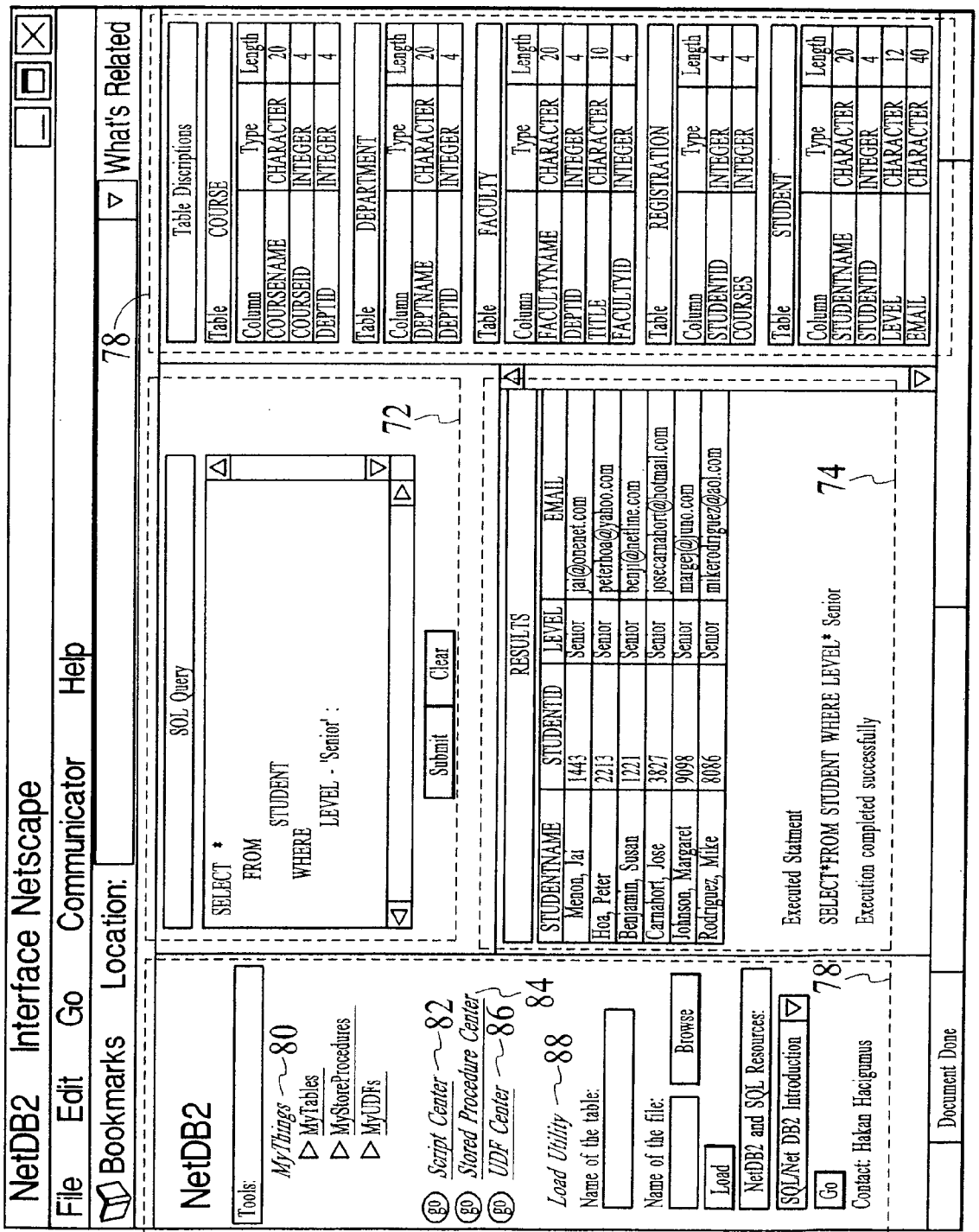
FIG. 2 is a view of a login screen of a database interface 70 in accordance with the present invention.

FIG. 2 is a view of a login screen of a database interface 70 in accordance with the present invention. The top-middle portion of the screen 72 is reserved for entering SQL queries. The lower-middle portion of the screen 74 shows the results of the SQL queries. Users commonly refer to metadata, tools, and documentation during the use of the database system service. The left portion of the screen 76 lists tools and available documentation, which are displayed upon a simple selection. Whenever metadata is queried from the left portion of the screen 76, the metadata queried is displayed on the right portion of the screen 78.

Figure 3:
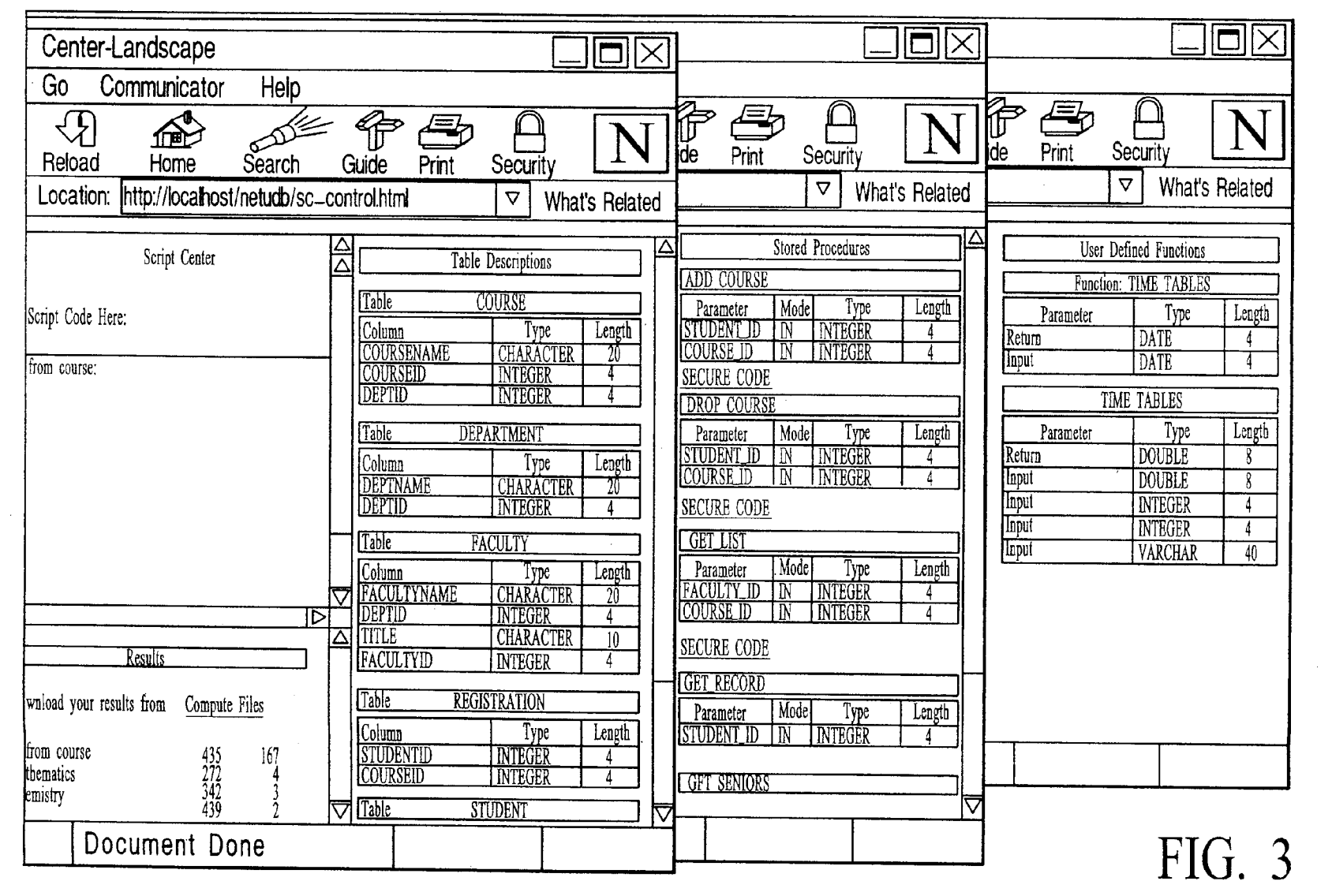

The different metadata can be queried by a single selection of MyThings 80. They include a list of tables, stored procedures, and user-defined functions. FIG. 3 is a view of a screen showing various metadata obtained on querying MyThings 80, in accordance with the present invention.

Referring back to FIG. 2, there are links to a script center 82, a stored procedure center 84, a user-defined function (UDF) center 86. Each center link can be associated with a separate database-application development facility. There is also a link to a bulk data Load utility 88.

The script center 82 allows users to send more than one SQL query to the data base system in one click. SQL queries can be separated by a delimiter character. The script center is particularly useful, for example, when an activity that is repeatedly performed against a database requires more than one SQL statement. Examples include the creation and population of a table or when users share scripts. FIG. 3 shows a portion of the script center.

Figure 4:
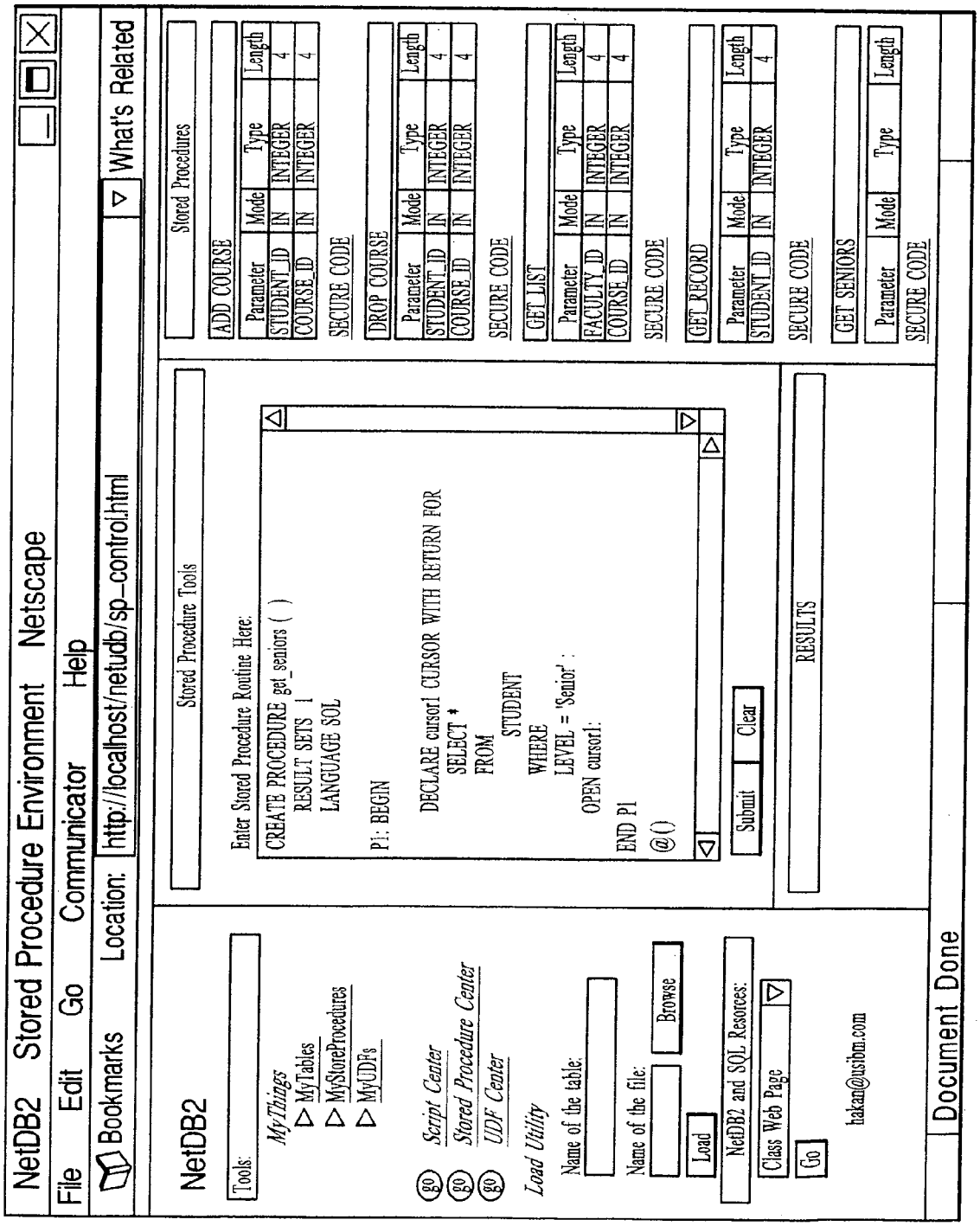
FIG. 4 is a view of a screen showing a stored procedures center, in accordance with the present invention.

FIG. 4 is a view of a screen showing the stored procedures center 84, in accordance with the present invention. The stored procedure center 84 is used to create stored procedures. Stored procedures are a set of SQL statements used together with control logic. Applications used stored procedures to implement logic outside or around SQL statements. They can reduce network communication and can been used to improve performance in client/server applications.

Figure 5:
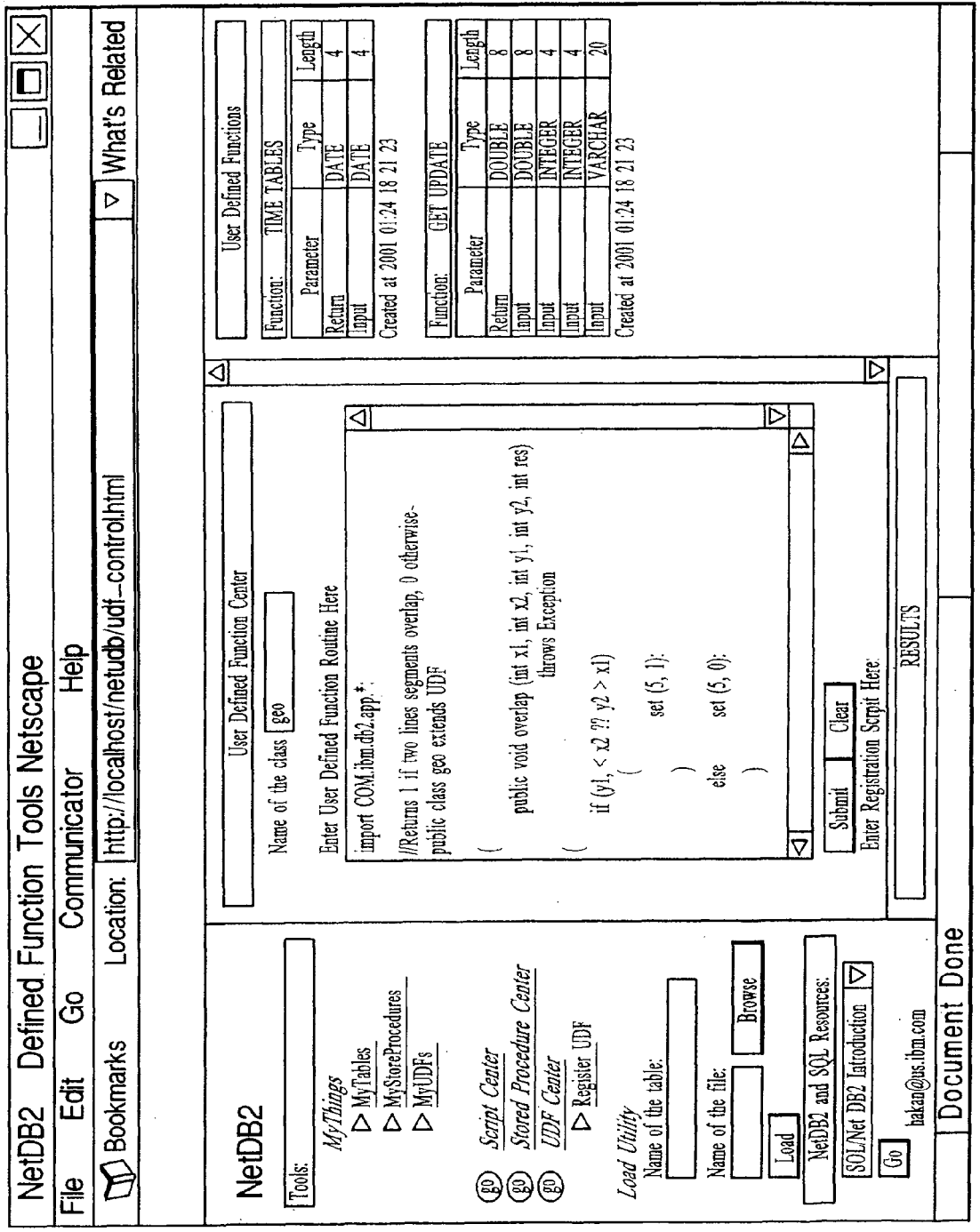
FIG. 5 is a view of a screen showing a defined function center, in accordance with the present invention.

FIG. 5 is a view of a screen showing a defined function center 86, in accordance with the present invention. The user-defined function center 86 is used to extend the built-in functions supplied with the database manager. A user can write or input user-defined function supplied with a database manager.

The bulk data Load utility 88 (link shown on FIG. 2) is useful, because data resides at the database service provider side. It is used to upload data from the user's computer through the network and insert into the user table specified.

Because the user manages the user-defined interface, the user can modify it as often as the user desires. This benefit is important because as such the user need not be required to consult with or seek authorization from another user or the database application programmer. Accordingly, the user-defined interface can be modified by the user when necessary to include functions and features meet any new needs of the user. In a specific embodiment, any particular user-defined interface can be modified by other authorized users. Such authorized users can be authorized by the user who created the user-defined database.

A user initially accesses the database system 50 via the database interface 62. During an initial setup session, the user can configure the database system 50 to allow access via a user-defined interface 68. Thereafter, during subsequent sessions, a connection between the user-defined interface 68 and the database server 52. The steps described below and shown in FIGS. 6 and 7 further explain the operation of the database system 50.

Figure 6:
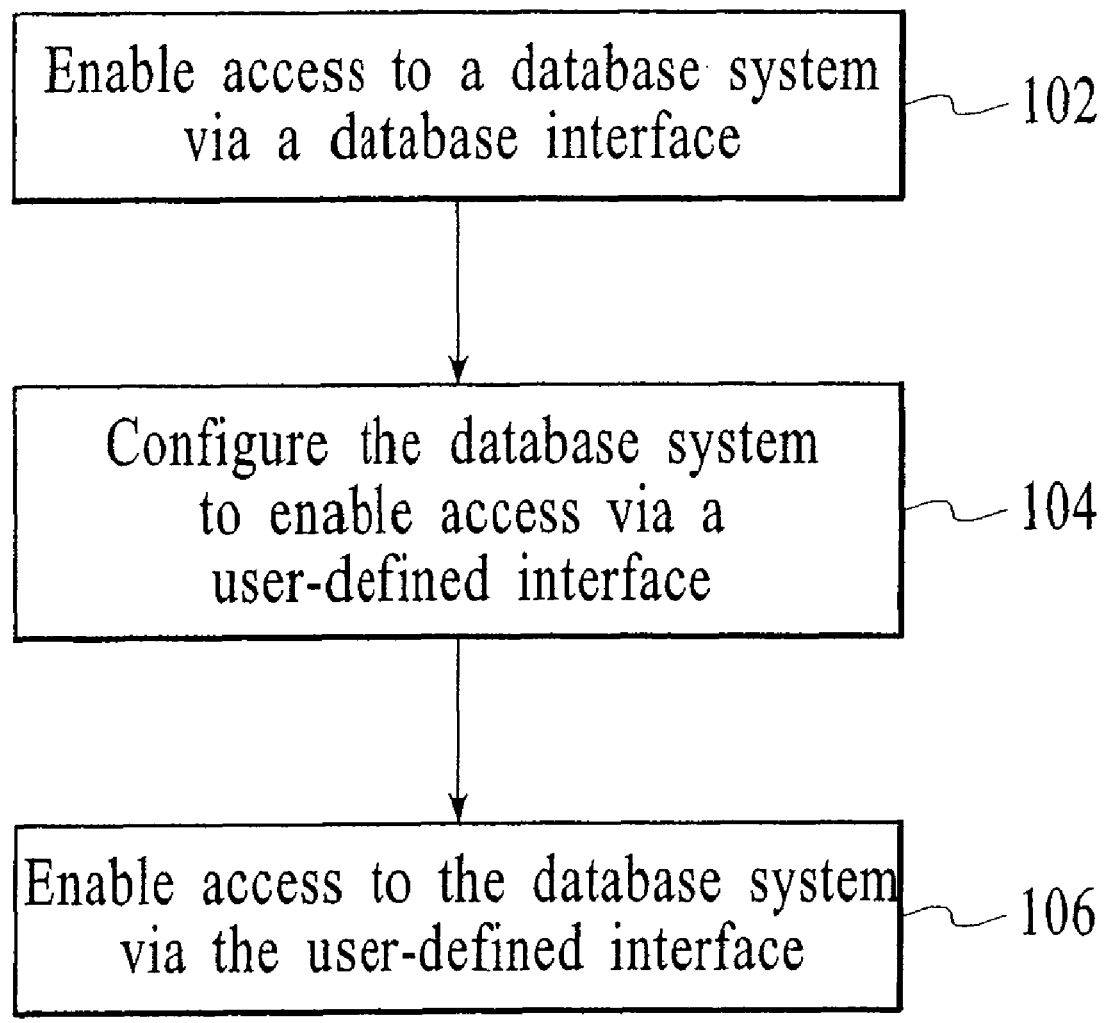
FIG. 6 is a flow chart showing a method for establishing an initial connection between a user-defined interface and a database system in accordance with the present invention.

FIG. 6 is a flow chart showing a method for establishing an initial connection between a user-defined interface and a database system in accordance with the present invention. In step 102, the database system enables access to it via a database interface. To enable access, the database system receives user information such as a user identification (ID) and password, for example.

Figure 7:
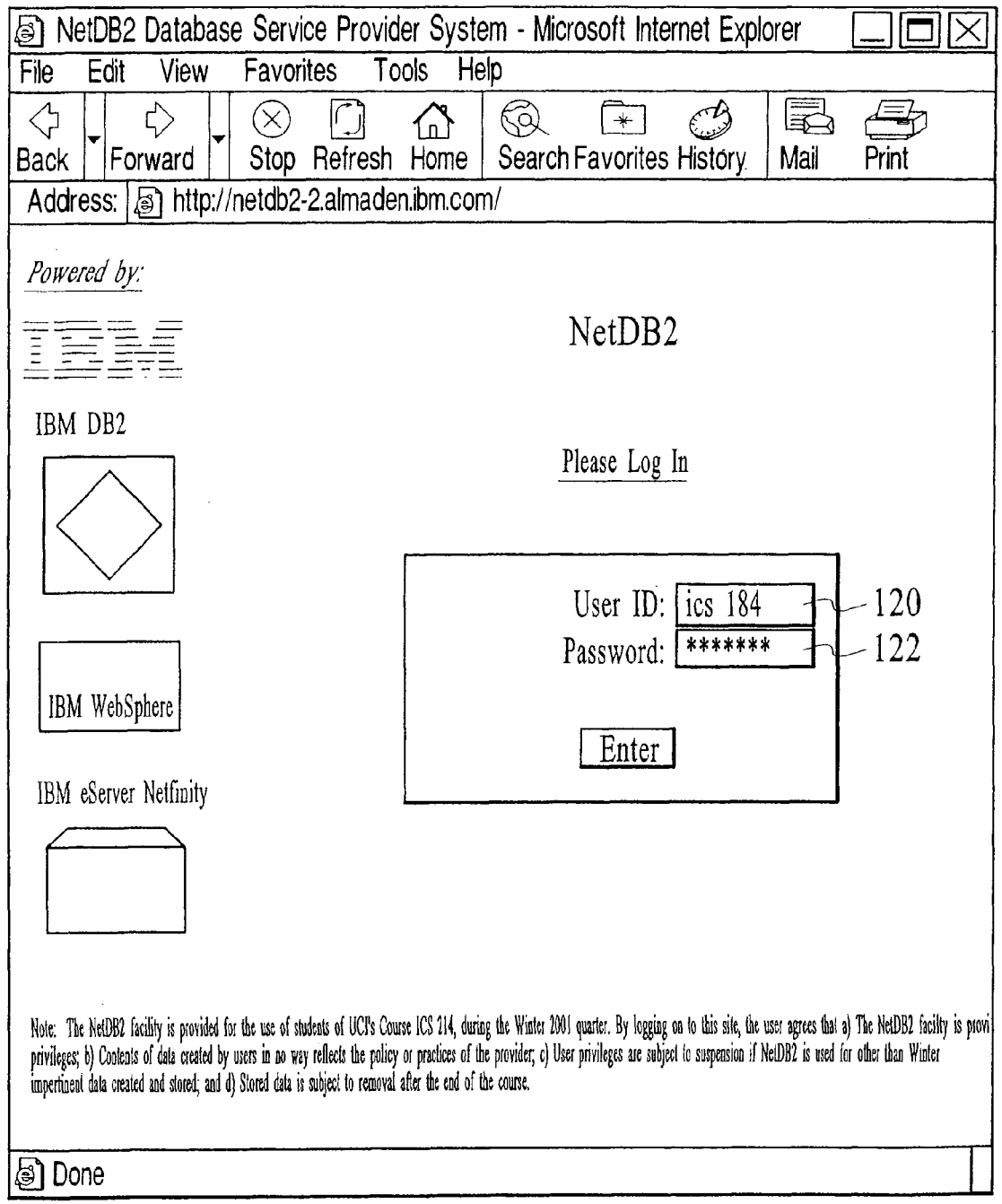
FIG. 7 is a view of a login screen of a database interface in accordance with the present invention.

FIG. 7 is a view of a login screen of a database interface in accordance with the present invention. In this specific embodiment, the database interface is a NetDB2 interface for a Net DB2 database system. As shown in FIG. 7, a user enters a user ID in the user ID field 120 and enters a password in the password field 122 to get access to a database system.

Note that while some embodiments of the present invention disclosed herein are described in the context of NetDB2 database systems, the present invention also applies to other database systems and still remains within the spirit and scope of the present invention.

Referring back to FIG. 6, in step 104, the database system is configured to enable access to the database system via a user-defined interface. More specifically, the database system enables the user-defined interface to have access to one or more databases of the database system. Steps 102 and 104 are generally referred to herein as an initial setup session.

Figure 8:
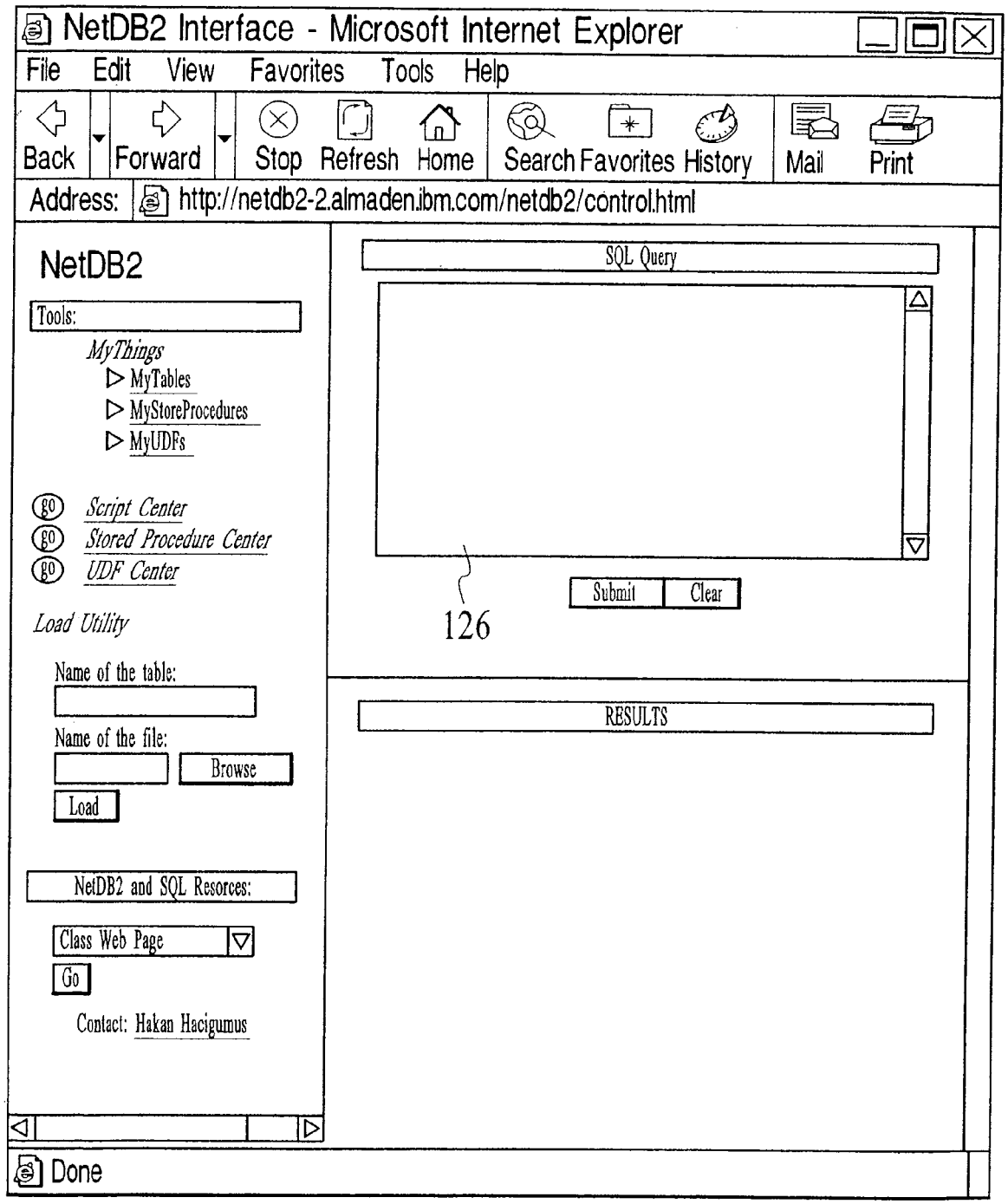
FIG. 8 is a view of a Structured Query Language (SQL) screen of the database interface of FIG. 7 in accordance with the present invention.

FIG. 8 is a view of a Structured Query Language (SQL) screen 126 of the database interface of FIG. 7 in accordance with the present invention.

Figure 9:
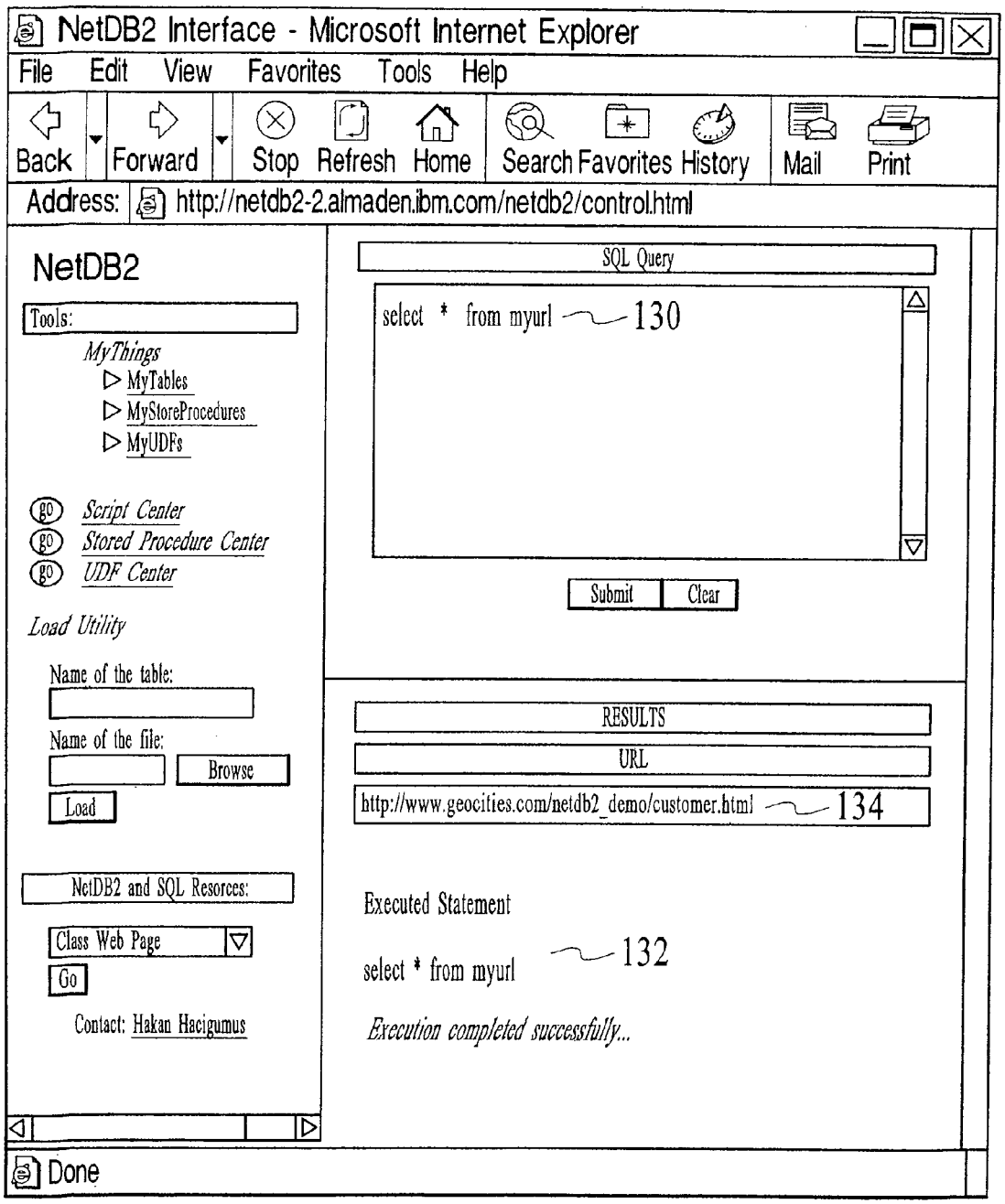
FIG. 9 is a view of the SQL screen of FIG. 8 with instructions directing the database system to a user-defined interface.

FIG. 9 is a view of the SQL screen of FIG. 8 with instructions 130 directing the database system to a user-defined interface. As shown, an executed statement 132 in an SQL field indicates a URL selection 134. While only one URL is shown in this specific embodiment, there can be multiple URLs from which to select. Upon execution of the executed statement, a user-selected URL corresponding to the executed statement is shown in a results box.

Referring back to FIG. 6, in step 106, the database system enables access the database system via the user-defined interface. Steps 102, 104, and 106 can be repeated for other user-defined interfaces.

Figure 10:
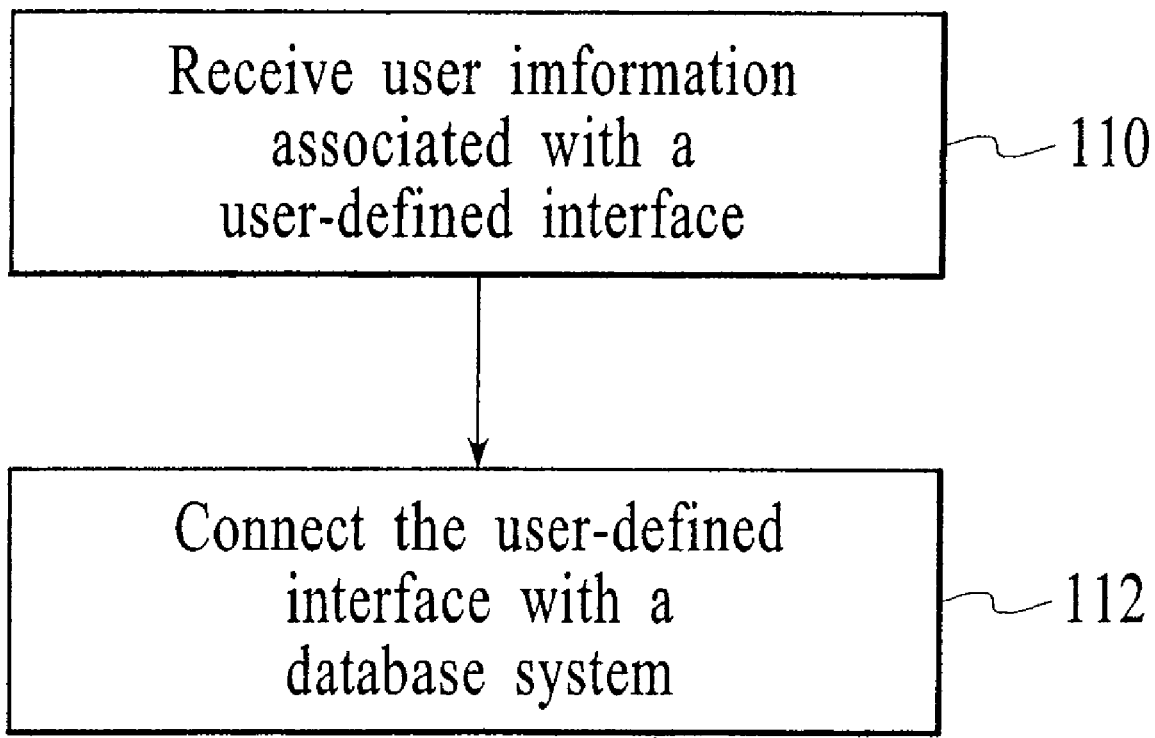
FIG. 10 is a flow chart showing a method for connecting a user-defined interface to a database system in accordance with the present invention.

FIG. 10 is a flow chart showing a method for connecting a user-defined interface to a database system in accordance with the present invention. In future sessions, i.e., after an initial setup session, the database system allows accesses to it via a user-defined interface. Each user-defined interface is customized to specific needs of a user or group of users having access to the user-defined interface.

In step 110, the database system receives user information. The user information can include user identification (ID) and a user password, for example. The user information is associated with a particular user-defined interface. In a specific embodiment, when the database system receives the user information, the database system creates an ID object. The ID object includes a session ID, which itself can include information such as a browser ID and a user ID. The session ID corresponds to a user database. The browser ID is associated with a user-defined interface and the user ID is associated with a particular user system. If the user information is valid, the database system recognizes the user information, e.g., session ID, and fetches one or more databases. The database system then connects the user-defined interface to at least one of the databases.

Figure 11:
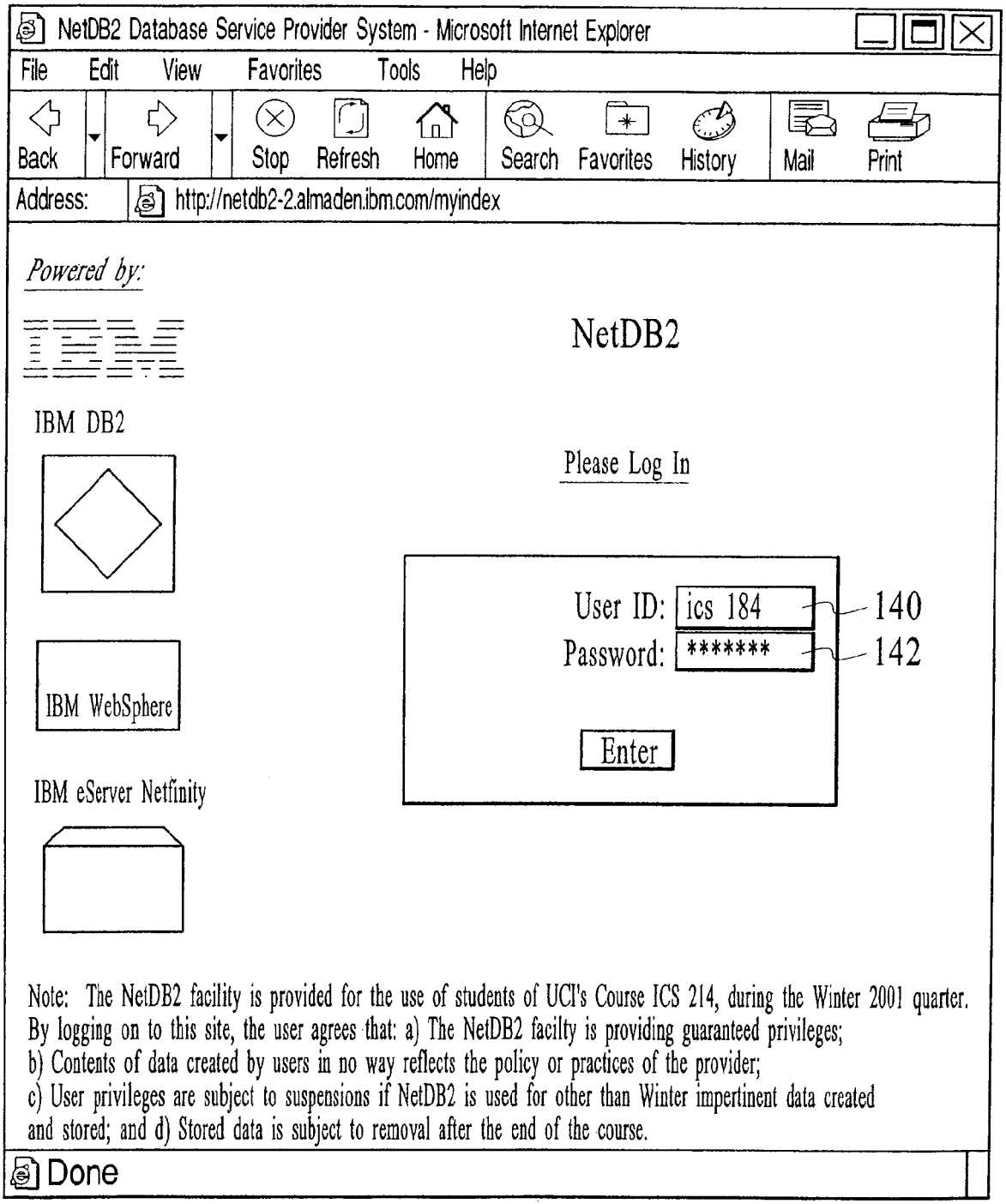
FIG. 11 is a view of a login screen of a user-defined interface subsequent to an initial set-up session in accordance with the present invention.

FIG. 11 is a view of a login screen of a user-defined interface subsequent to an initial setup session in accordance with the present invention. In this specific embodiment, the database login screen looks the same as the database login screen of FIG. 7. The user enters the same user ID and a password as entered in FIG. 7. However, after the initial setup session as shown in FIGS. 7-9, the database system takes the user to a user-selected URL such as the URL shown in FIG. 9, for example. In fact, during sessions subsequent to the initial setup session, the database system routes all traffic associated with the user-selected URL.

Referring back to FIG. 10, in step 112, the database system connects the user-defined interface to the database system. More specifically, when the user-defined interface is coupled to the database system, the database system can connect the user-defined interface to at least one of the databases. Also, a database server manages the connection between the user-defined interface and the one or more databases. In a preferred embodiment, the user database is a NetDB2 database.

Each database can be managed by a user via a user-defined interface corresponding to each database. In a specific embodiment, each database can also be accessed by multiple user-defined interfaces, whether or not a given database is managed by an accessing user-defined interface.

When the user-defined interface is coupled to the database system, the database system passes structured query language (SQL) between the uniform resource locator (URL) of the user-defined interface and the database system.

FIGS. 12-18 are views of screens further exemplifying a user-defined interface.

Figure 12:
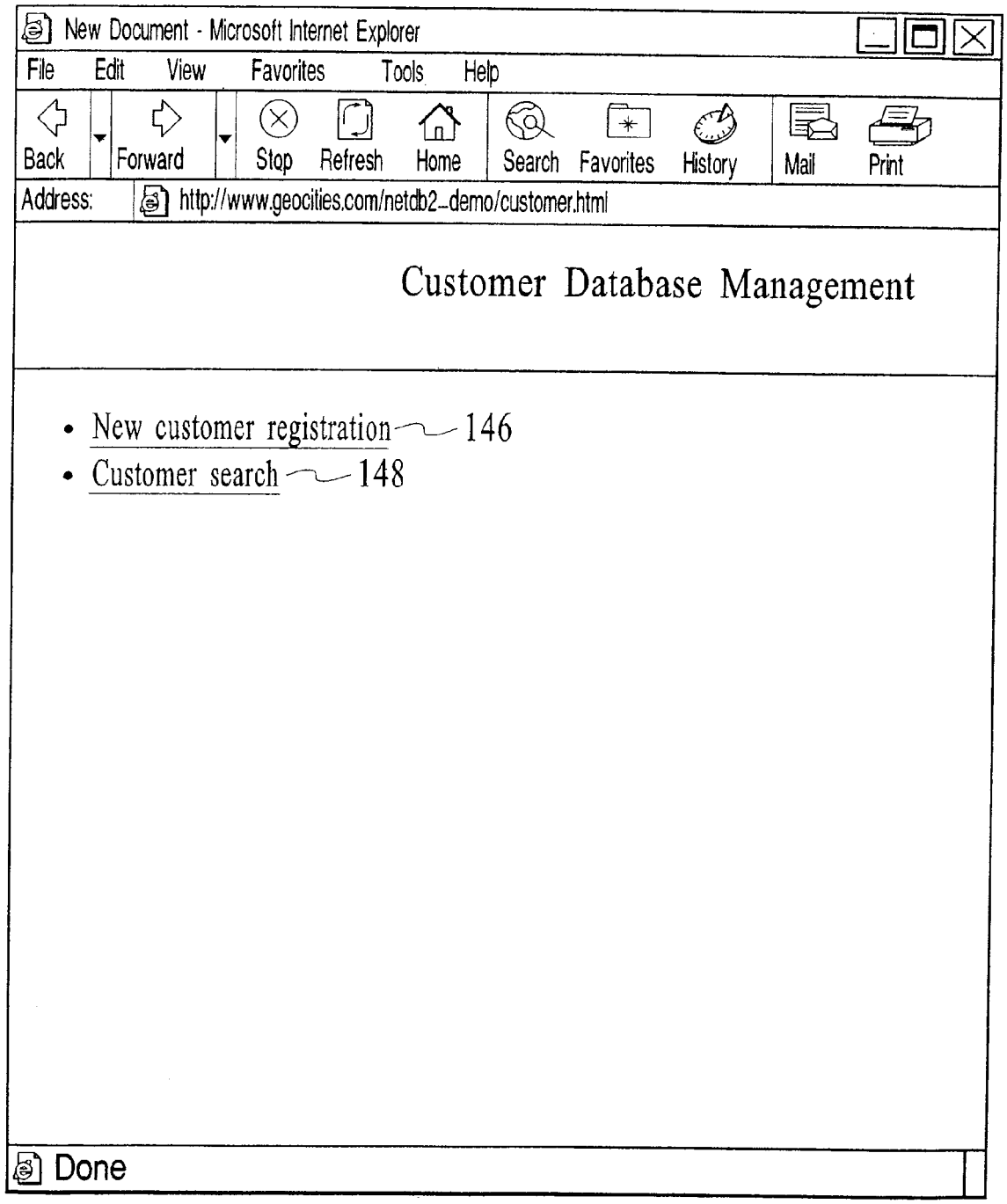
FIG. 12 is a view of a screen of the user-defined interface of FIG. 11, where the screen shows a "New customer registration" hypertext link and a "Customer search" hypertext link in accordance with the present invention.

FIG. 12 is a view of a screen of the user-defined interface of FIG. 11 where the screen shows a "New customer registration" hypertext link 146 and a "Customer search" hypertext link 148 in accordance with the present invention. For ease of illustration, the screen shown is simple and includes two hypertext links. The complexity of the screen of the user-defined interface can vary and will depend of the specific application.

Figure 13:
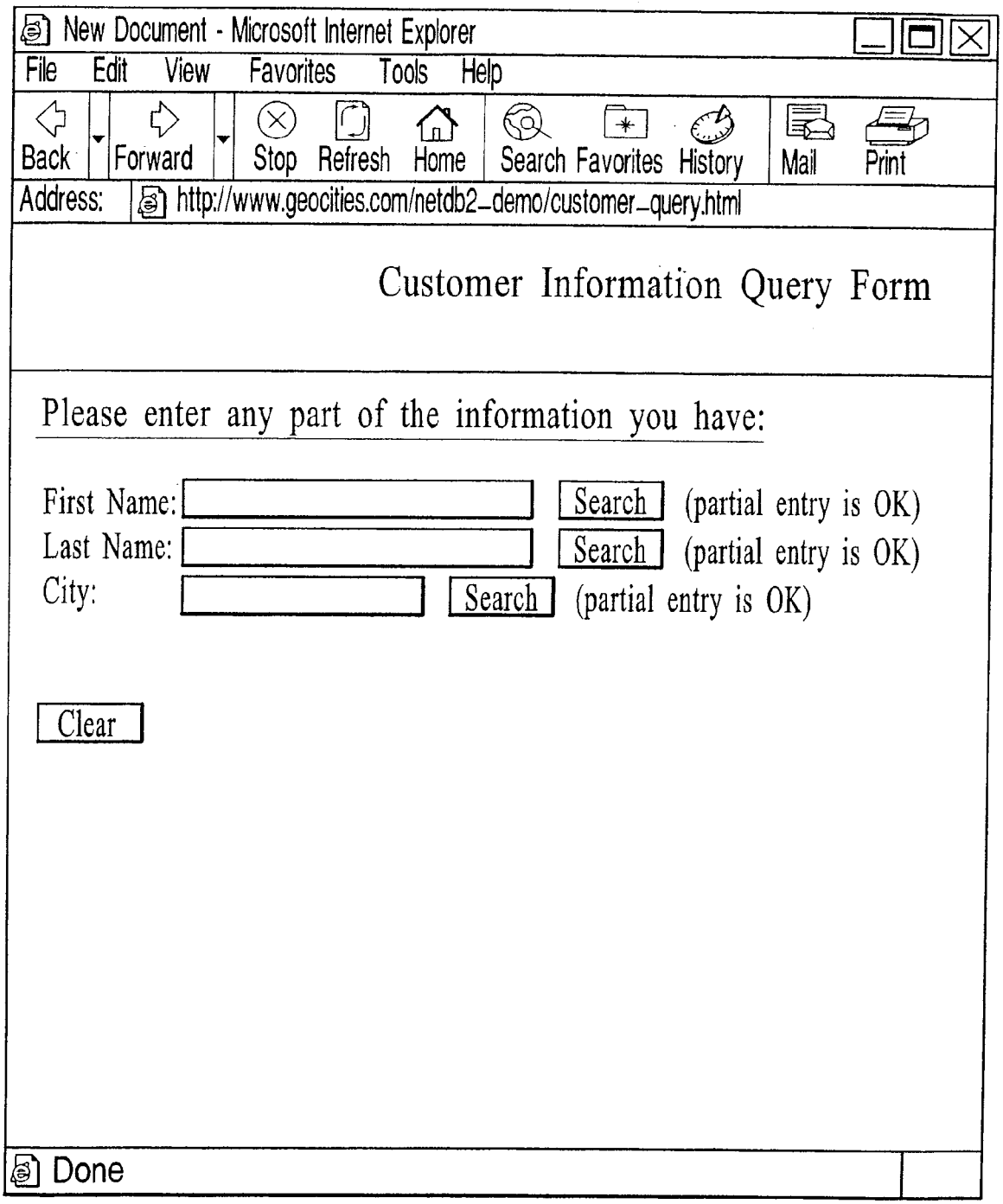
FIG. 13 is a view of a screen that appears when the "Customer search" hypertext link of FIG. 12 is selected, in accordance with the present invention.

FIG. 13 is a view of a screen that appears when the "Customer search" hypertext link 148 of FIG. 12 is selected, in accordance with the present invention.

FIG. 14 is a view of another screen of the user-defined interface in accordance with the present invention. This view shows examples of customer information that can be retrieved from a database via the user-defined interface.

Figure 15:
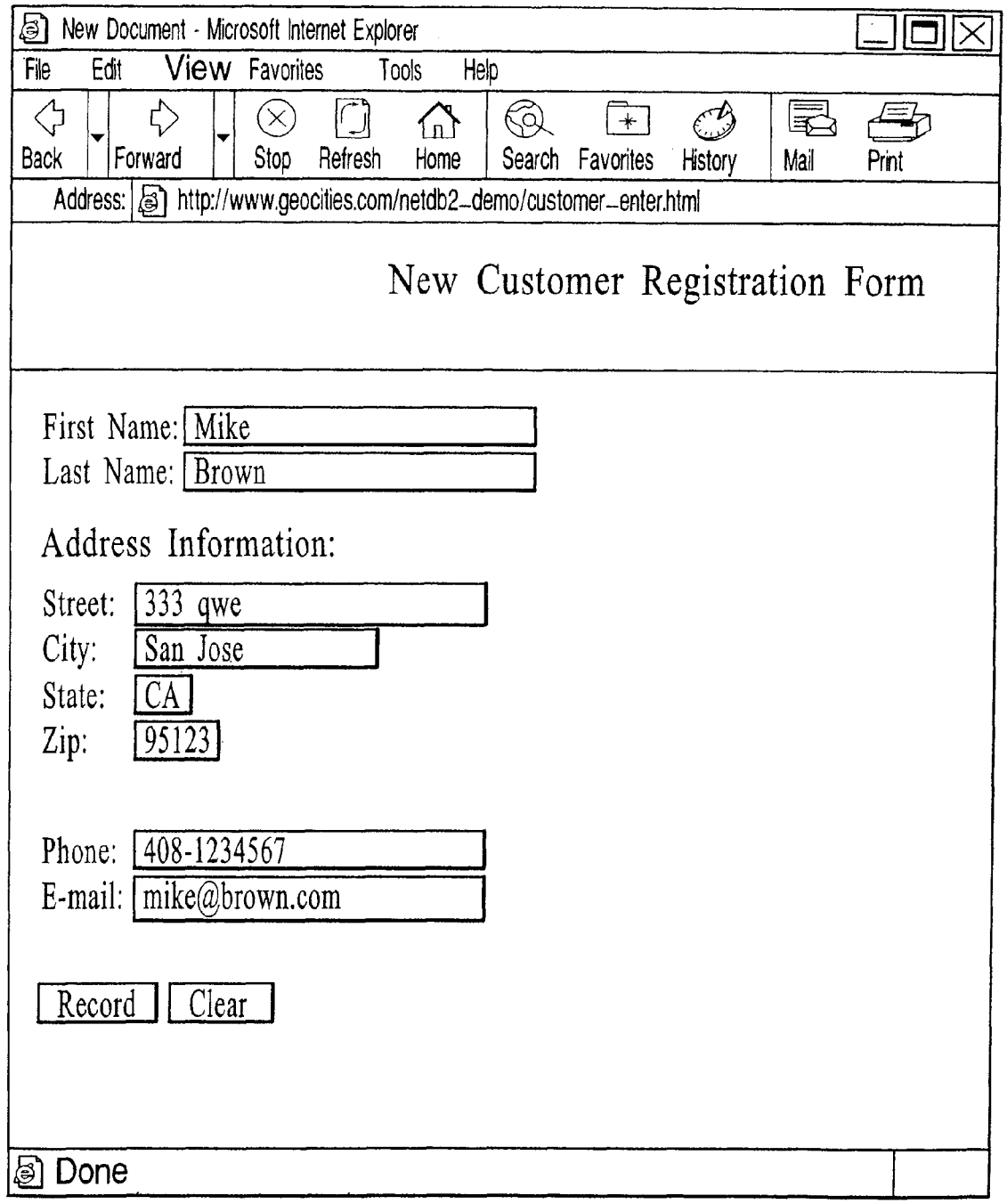
FIG. 15 is a view of a screen that appears when the "New customer registration" hypertext link of FIG. 12 is selected, in accordance with the present invention.

FIG. 15 is a view of a screen that appears when the "New customer registration" hypertext link 146 of FIG. 12 is selected, in accordance with the present invention. This view shows fields provided by the user-defined interface. New customer information can be entered into these fields.

Figure 16:
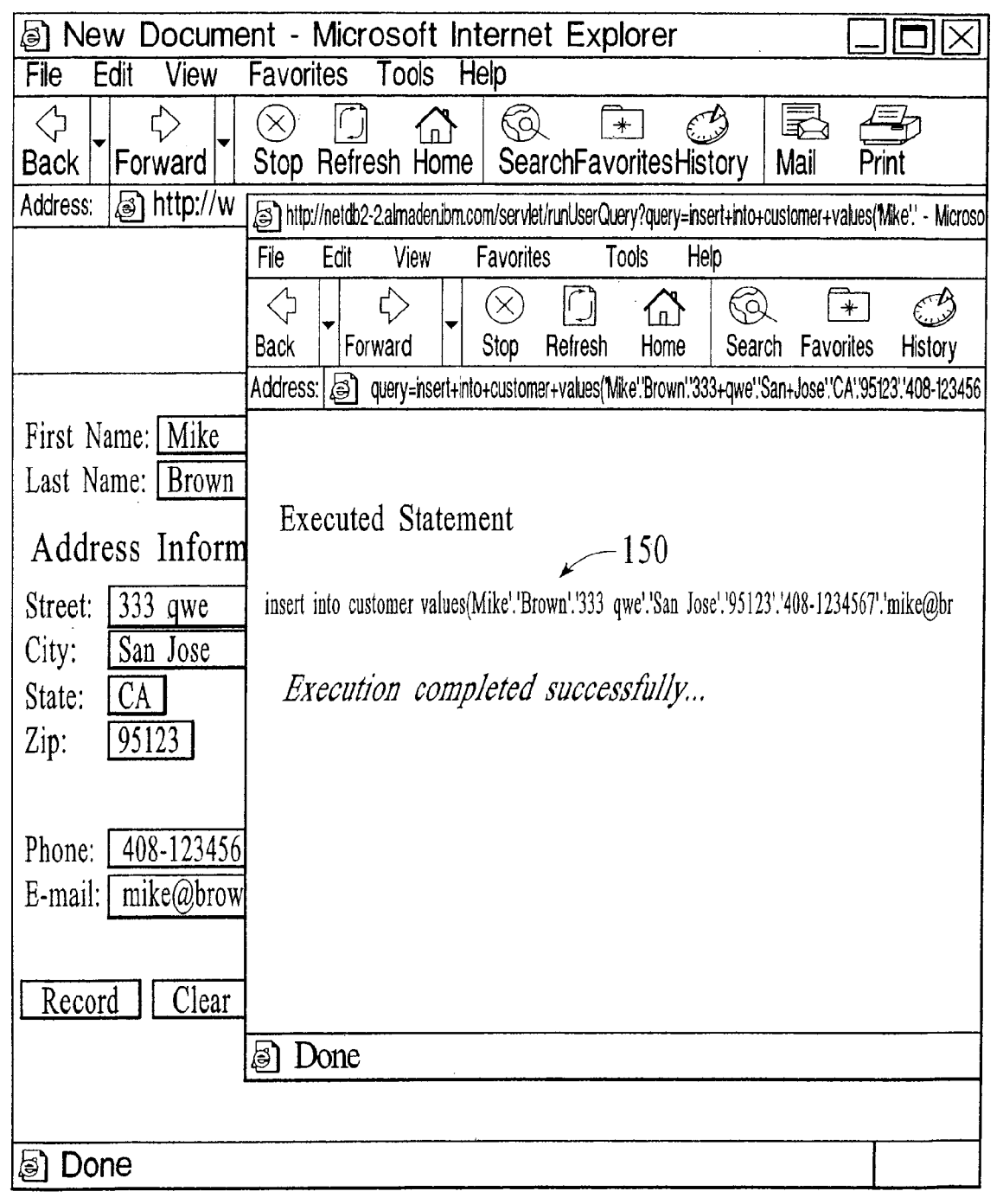

FIG. 16 is a view of a screen that appears after the information of FIG. 15 has been submitted. The screen includes an execution statement 150.

Figure 17:
FIG. 17 is a view of the same screen of FIG. 13 where the new customer information of FIG. 15 has been entered.

FIG. 17 is a view of the same screen of FIG. 13 where the new customer information of FIG. 15 has been entered.

FIG. 18 is a view of a screen similar to that of FIG. 14 where the new customer information of FIG. 15 has been retrieved along with information of other customers with the same last name.

According to the method and system disclosed herein, the present invention provides numerous benefits. For example, it enables a user to access a database system via a customized interface.

Multiple user-defined interfaces access one or more databases. As such, user-friendly access to one or more databases is allowed.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A database system, comprising:
   a database server, wherein the database server is managed and maintained by one or more database application programmers;
   at least one database coupled to the database server, wherein the database server enables access to the at least one database;
   a database interface configured to provide queries for the database server and to display information from the database server, the database interface associated with the database server and being managed and maintained by the one or more database application programmers; and
   a user-defined visual user interface distinct from the database interface and configured by the database interface to communicate with and have access to the at least one database via the database server as an alternative to the database interface for a user that is different from the one or more database application programmers, wherein the user-defined visual user interface is created, managed, and customized by the user to have customized functionality to suit specific needs of the user, wherein the customized functionality is not restricted by functionality provided by the database interface, and wherein the user does not manage and does not maintain the database interface.

2. The database system of claim 1, wherein the user-defined visual user interface is associated with the user such that the user is an associated user, and wherein the user-defined visual user interface is presented to the associated user and is connected to the at least one database when the associated user is identified to the database system.

3. The database system of claim 1, wherein the customized functionality of the user-defined visual user interface can be modified by the user as changes are needed, and wherein a modification to the user-defined visual user interface can be accomplished by the user without authorization from the one or more database application programmers.

4. The database system of claim 2, wherein the user previously designated the user-defined visual user interface to be presented and connected to the at least one database when the user is identified.

5. The database system of claim 2, wherein the database interface is used to configure the user-defined visual user interface and associate the user with the user-defined visual user interface during an initial setup session, wherein the user-defined visual user interface can have access to the at least one database in subsequent sessions after the initial setup session without having to configure the user-defined visual user interface to have access to the at least one database.

6. The database system of claim 1, wherein the database system is a relational database system and the user-defined visual user interface is a relational database interface.

7. The database system of claim 1, wherein the user-defined visual user interface is one of a plurality of different user-defined visual user interfaces, each of the user interfaces being configured to have access to the at least one database and each of the user interfaces being associated with at least one of a plurality of users of the database system.

8. The database system of claim 1, wherein the customized functionality of the user-defined visual user interface includes at least one user-defined interface feature created by the user and operative to provide a user-defined query for the at least one database, wherein the user-defined query is enabled by the customized functionality and not restricted by the functionality provided by the database interface.

9. The database system of claim 1, wherein the customized functionality of the user-defined visual user interface includes at least one user-defined interface feature operative to receive input used in accessing the at least one database.

10. A computer-implemented method for providing access to a database system, the database system including at least one database, the computer-implemented method comprising:
    configuring the database system to enable a user-defined visual user interface to access the at least one database, wherein the database system includes a database server managed and maintained by one or more database application programmers and includes a database interface associated with a database server and distinct from the user-defined visual user interface for a user that is different from the one or more database application programmers, wherein the database interface is managed and maintained by the one or more database application programmers, is configured to provide queries for the database server and display information from the database server, and is used to configure the user-defined visual user interface to have access to the at least one database; and
    executing at least one instruction to connect the user-defined visual user interface to the least one database as an alternative to the database interface for the user that is different from the one or more database application programmers, wherein the user-defined visual user interface is created, managed, and customized by the user to have customized functionality determined by the user to suit specific needs of the user, wherein the customized functionality is not restricted by functionality provided by the database interface, and wherein the user does not manage and does not maintain the database interface.

11. The computer-implemented method of claim 10, wherein the customized functionality of the user-defined visual user interface includes at least one user-defined interface feature created by the user and operative to provide a user-defined query for the at least one database, wherein the user-defined query is enabled by the customized functionality and not restricted by the functionality provided by the database interface.

12. The computer-implemented method of claim 10, wherein the database system is configured to enable the user-defined visual user interface to access the at least one database via the database interface during an initial setup session.

13. The computer-implemented method of claim 10, wherein connecting the user-defined visual user interface to the least one database comprises receiving user information to enable the user to log into the database system, wherein the user information used to log into the database system when configuring the database system is the same user information used to log into the database system when connecting the user-defined visual user interface to the at least one database.

14. The computer-implemented method of claim 10, further comprising the step of querying the database system for a list of tables.

15. The computer-implemented method of claim 10, further comprising querying the database system for a list of stored procedures.

16. The computer-implemented method of claim 10, further comprising querying the database system for a list of user-defined functions.

17. The computer-implemented method of claim 10, further comprising creating stored procedures.

18. The computer-implemented method of claim 10, further comprising extending one or more built-in functions supplied by the one or more database application programmers.

19. A computer-implemented method for providing access to a database system, the database system including at least one database, the computer-implemented method comprising:

receiving user information associated with a user-defined visual user interface configured to communicate with the at least one database via a database server, the user-defined visual user interface comprising an alternative interface for a user to a database interface, the database interface being distinct from the user-defined visual user interface, the user-defined visual interface associated with the database server, the user-defined visual interface to provide queries for the database server, to display information from the database server, and to configure the user-defined visual user interface to enable access to the at least one database, wherein the user-defined visual user interface is stored and is created, managed, and customized by the user that is different from one or more database application programmers who manage and maintain the database system and the database interface and wherein the user does not manage and does not maintain the database interface, wherein the user-defined visual user interface includes customized functionality that is stored and determined by the user to suit specific needs of the user, and wherein the customized functionality is not restricted by functionality provided by the database interface; and storing the user information and using the user information to connect the user-defined visual user interface to the at least one database.

20. The computer-implemented method of claim 19, wherein connecting the user-defined visual user interface to the at least one database comprises creating an identification (ID) object from the user information.

21. The computer-implemented method of claim 20, wherein the ID object includes a session ID, wherein the session ID corresponds to a user database.

22. The computer-implemented method of claim 21, wherein the session ID includes a browser ID and a user ID, wherein the browser ID is associated with the user-defined visual user interface and the user ID is associated with a user system.

23. The computer-implemented method of claim 19, wherein the customized functionality of the user-defined visual user interface includes at least one user-defined interface feature created by the user and operative to provide a user-defined query for the at least one database, wherein the user-defined query is enabled by the customized functionality and not restricted by the functionality provided by the database interface.

24. A computer-readable storage medium including program instructions for connecting a user-defined visual user interface to at least one database, the program instructions executable by a computer to configure a database system to enable the user-defined visual user interface to access the at least one database, wherein the database system includes a database server managed and maintained by one or more database application programmers and includes a database interface associated with the database server and distinct from the user-defined visual user interface for a user that is different from the one or more database application programmers, wherein the database interface is associated with the database server, is managed and maintained by the one or more database application programmers, is configured to provide queries for the database server and display information from the database server, and is used to configure the user-defined visual user interface to have access to the at least one database; and execute at least one instruction to connect the user-defined visual user interface to the least one database as an alternative to the database interface for a user that is different from the one or more database application programmers, wherein the user-defined visual user interface is created, managed, and customized by the user to have customized functionality determined by the user to suit specific needs of the user, and wherein the customized functionality is not restricted by functionality provided by the database interface, and wherein the user does not manage and does not maintain the database interface.

25. A computer-readable storage medium including program instructions for connecting a user-defined visual user interface to at least one database, the program instructions executable by a computer to:

receive user information associated with a user-defined visual user interface configured to communicate with the at least one database via a database server as an alternative for a user to a database interface, the database interface being distinct from the user-defined visual user interface, associated with the database server, providing queries for the database server, displaying information from the database server, and being used to configure the user-defined visual user interface to have access to the at least one database, wherein the user-defined visual user interface is stored and is created, managed, and customized by the user that is different from one or more database application programmers who manage and maintain the database system and database interface and wherein the user does not manage and does not maintain the database interface, wherein the user-defined visual user interface includes customized functionality that is stored and determined by the user to suit specific needs of the user, and wherein the customized functionality is not restricted by functionality provided by the database interface; and store the user information and using the user information to connect the user-defined visual user interface to the at least one database.

* * * * *